US011493150B2

(12) United States Patent
Vaccaro et al.

(10) Patent No.: US 11,493,150 B2
(45) Date of Patent: Nov. 8, 2022

(54) ISOLATOR FOR MOUNTING CABLE HANGERS

(71) Applicant: CommScope Technologies LLC, Hickory, NC (US)

(72) Inventors: Ronald A. Vaccaro, Taylorsville, NC (US); Aviral Joshi, Chicago, IL (US); Christopher Stockman, Bella Vista, AR (US)

(73) Assignee: CommScope Technologies LLC, Hickory, NC (US)

( * ) Notice: Subject to any disclaimer, the term of this patent is extended or adjusted under 35 U.S.C. 154(b) by 412 days.

(21) Appl. No.: 16/567,911

(22) Filed: Sep. 11, 2019

(65) Prior Publication Data

US 2020/0003338 A1 Jan. 2, 2020

Related U.S. Application Data

(63) Continuation-in-part of application No. 16/413,246, filed on May 15, 2019, now Pat. No. 10,851,916.

(60) Provisional application No. 62/686,882, filed on Jun. 19, 2018.

(51) Int. Cl.
| *F16L 3/127* | (2006.01) |
| *H01Q 1/12* | (2006.01) |
| *H02G 7/20* | (2006.01) |
| *H02G 9/08* | (2006.01) |

(52) U.S. Cl.
CPC ............... *F16L 3/127* (2013.01); *H01Q 1/12* (2013.01); *H02G 7/205* (2013.01); *H02G 9/08* (2013.01)

(58) Field of Classification Search
CPC . F16L 3/00; F16B 21/088; H02G 3/26; A63H 33/086; A63H 33/088

USPC ..... 248/49, 55, 58, 60, 62, 63, 65, 68.1, 69, 248/70, 72, 74.1, 74.3, 74.5; 446/128
See application file for complete search history.

(56) References Cited

U.S. PATENT DOCUMENTS

| 1,858,101 | A | | 5/1932 | McAfee | |
| 1,931,036 | A | * | 10/1933 | Ryan | H01Q 1/528 343/721 |
| 2,166,916 | A | * | 7/1939 | Lombard | F16B 2/245 248/73 |
| 3,444,596 | A | * | 5/1969 | Soltysik | F16L 3/13 248/73 |
| 4,094,483 | A | * | 6/1978 | Busch | F16B 5/0685 248/222.12 |

(Continued)

FOREIGN PATENT DOCUMENTS

| CN | 2577485 Y | 10/2003 |
| KR | 100715224 | 4/2007 |

(Continued)

OTHER PUBLICATIONS

"Office Action corresponding to Chinese Application No. 201980026216.6 dated May 20, 2021".

(Continued)

*Primary Examiner* — Terrell L McKinnon
*Assistant Examiner* — Michael McDuffie
(74) *Attorney, Agent, or Firm* — Myers Bigel, P.A.

(57) ABSTRACT

An isolator for mounting cable hangers, comprising: a platform having a hole; two extenders extending away from the bottom surface of the platform; and two locking clips, wherein each locking clip extends from an extender in a direction that is away from the bottom surface of the platform.

12 Claims, 10 Drawing Sheets

(56) References Cited

U.S. PATENT DOCUMENTS

| | | | |
|---|---|---|---|
| 5,230,496 A | 7/1993 | Shillington et al. | |
| 5,547,322 A * | 8/1996 | Lilja | A01K 3/00 |
| | | | 248/73 |
| 5,833,188 A | 11/1998 | Studdiford et al. | |
| 6,257,530 B1 | 7/2001 | Tsai | |
| 6,355,887 B1 | 3/2002 | Gretz | |
| 6,669,151 B2 | 12/2003 | Mascadri | |
| 6,758,300 B2 | 7/2004 | Kromis et al. | |
| 7,090,174 B2 * | 8/2006 | Korczak | F16B 37/045 |
| | | | 248/61 |
| 7,097,142 B1 * | 8/2006 | Schmidt | F16L 3/12 |
| | | | 248/68.1 |
| 7,278,613 B2 | 10/2007 | Roy | |
| 7,441,731 B2 | 10/2008 | Smart et al. | |
| 7,571,880 B2 | 8/2009 | Perez | |
| 7,793,895 B2 * | 9/2010 | Franks | F16B 19/00 |
| | | | 248/74.3 |
| 7,947,078 B2 | 5/2011 | Siegal | |
| 8,011,621 B2 * | 9/2011 | Korczak | F16L 3/127 |
| | | | 248/68.1 |
| 8,356,778 B2 | 1/2013 | Birli et al. | |
| 8,439,316 B2 | 5/2013 | Feige | |
| 8,851,430 B2 | 10/2014 | Mulzer | |
| 9,853,434 B2 | 12/2017 | Vaccaro | |
| 9,866,004 B2 | 1/2018 | Vaccaro et al. | |
| 9,903,510 B2 | 2/2018 | Joshi et al. | |
| 10,253,906 B2 | 4/2019 | Vaccaro | |
| 10,273,995 B2 * | 4/2019 | Pulsipher | F16B 5/0692 |
| 10,415,723 B2 | 9/2019 | Vaccaro et al. | |
| 10,508,757 B2 * | 12/2019 | Vaccaro | F16L 3/221 |
| 10,637,226 B2 * | 4/2020 | Bell | H02G 3/32 |
| 10,663,088 B2 * | 5/2020 | Vaccaro | H02G 3/32 |
| 10,876,555 B2 * | 12/2020 | Korhonen | F16B 5/0008 |
| 10,927,980 B2 * | 2/2021 | Varale | H02G 3/32 |
| 10,941,883 B2 * | 3/2021 | Bell | F16L 3/221 |
| 2004/0206545 A1 | 10/2004 | Tracy et al. | |
| 2005/0173597 A1 | 8/2005 | Farrell et al. | |
| 2006/0231691 A1 | 10/2006 | Edgren | |
| 2006/0249633 A1 | 11/2006 | Korczak et al. | |
| 2006/0249634 A1 * | 11/2006 | Van Walraven | F16B 21/02 |
| | | | 248/71 |
| 2007/0045482 A1 | 3/2007 | Smart et al. | |
| 2009/0050753 A1 | 2/2009 | Gabriel | |
| 2009/0230256 A1 * | 9/2009 | Widlacki | F16L 3/222 |
| | | | 248/68.1 |
| 2010/0108825 A1 | 5/2010 | Brock | |
| 2011/0006168 A1 | 1/2011 | Pallitto et al. | |
| 2011/0126934 A1 | 6/2011 | Thuesen | |
| 2011/0283515 A1 | 11/2011 | Korczak | |
| 2013/0206928 A1 | 8/2013 | Murakoshi et al. | |
| 2015/0001351 A1 | 1/2015 | Krager et al. | |
| 2015/0129726 A1 | 5/2015 | Sherman et al. | |
| 2016/0009469 A1 | 1/2016 | Schneider De Oliveira et al. | |
| 2016/0281881 A1 * | 9/2016 | Vaccaro | E01F 9/608 |
| 2018/0045336 A1 * | 2/2018 | Vaccaro | F16L 3/221 |
| 2020/0003338 A1 | 1/2020 | Vaccaro et al. | |
| 2020/0109800 A1 | 4/2020 | Bell et al. | |

FOREIGN PATENT DOCUMENTS

| | | |
|---|---|---|
| KR | 100721852 | 5/2007 |
| KR | 20100081513 | 7/2010 |
| KR | 101802395 B1 | 11/2017 |
| WO | 2010143222 A1 | 12/2010 |
| WO | 2018089154 A1 | 5/2018 |

OTHER PUBLICATIONS

International Search Report and Written Opinion corresponding to International Application No. PCT/US2019/029130 dated Sep. 11, 2019.

"International Preliminary Report on Patentability corresponding to International Application No. PCT/US2019/029130 dated Dec. 30, 2020".

"International Search Report and Written Opinion corresponding to International Application No. PCT/US2020/048859 dated Dec. 11, 2020".

"International Preliminary Report on Patentability corresponding to International Application No. PCT/US2020/048859 dated Mar. 24, 2022".

\* cited by examiner

ISOLATOR FOR MOUNTING CABLE HANGERS

RELATED APPLICATION

The present application is a continuation-in-part of U.S. patent application Ser. No. 16/413,246, which was filed on May 15, 2019 and claims priority from and the benefit of U.S. Provisional Patent Application No. 62/686,882, filed Jun. 19, 2018, the disclosure of which is hereby incorporated herein by reference in its entirety.

FIELD OF THE INVENTION

The present invention relates generally to devices for supporting cables and, in particular, to hangers for securing cables to support structures.

BACKGROUND OF THE INVENTION

Cable hangers are commonly used to secure cables to structural members of antenna towers and/or along tunnel walls. Generally, each cable is attached to a structural member by cable hangers mounted at periodically-spaced attachment points.

Antenna towers and/or tunnels may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable-type cable hangers significantly increase the number of cables mountable to a single attachment point.

One popular stackable cable hanger is discussed in U.S. Pat. No. 8,191,836 to Korczak, the disclosure of which is hereby incorporated herein in its entirety. Hangers disclosed therein have generally a U- or C-shaped profile with rounded arms. A locking projection extends from the free end of each arm, and the "root" of the hanger that spans the fixed ends of the arms has a large aperture. The hanger can hold, a cable between the arms; gripping of the cable is enhanced by short fingers that extend inwardly from the arms to engage the cable. The locking projections of a hanger are inserted into a hole in the antenna tower (typically in the leg of the antenna tower) to secure the hanger to the tower. Hangers can be "stacked" onto each other by inserting the locking projections of one hanger into the large aperture of the next hanger. One variety of cable hangar of this type is the SNAP-STAK® hanger, available from CommScope, Inc. (Joliet, Ill.). Other cable hangers are shown in U.S. Pat. No. 9,866,004, issued Jan. 4, 2018, U.S. Pat. No. 9,853,434, issued Dec. 26, 2017, and U.S. Pat. No. 9,903,510, issued Feb. 27, 2018, the disclosures of each of which are hereby incorporated herein by reference in full.

In some instances, it may be desirable to mount multiple stacks of cable hangers in close proximity. In such instances, it may be desirable to employ an adapter, such as that shown at 10 in FIG. 1. The adapter 10 has a trapezoidal profile, with a base panel 12 and three serially-attached mounting panels 14. Each of the mounting panels 14 includes a mounting hole 16 (typically a nominal ¾ inch hole) that can receive a cable hanger such as those described above, one of which is designated 20 in FIG. 2. The base panel 12 of the adapter 10 has a hole 18 that can be used to mount the adapter 10 to a mounting structure via a bolt. The base panel 12 also includes slots 22 on either side of the hole 18 that can receive a hose clamp 26 or the like to mount the adapter 10 to a pole 24, as shown in FIG. 3. This mounting approach may be desirable when the pole 24 has no pre-formed holes to receive a typical cable hanger.

Areas near cellular antennas (i.e., within 1λ, or one wavelength) can be (relatively) high radio frequency (RF) energy environments. Conductive items in these areas, such as hangers and other hardware, can generate undesirable passive intermodulation (PIM). Typical examples of potential PIM-generating conditions include the combination of steel-on-steel contact (between two or more components), plus low contact pressure and/or relative movement between the steel components at the joint. As such, it may be desirable to provide solutions for hanging cables with reduced (or eliminated) likelihood of PIM generation.

SUMMARY

As a first aspect, embodiments of the invention are directed to an isolator for mounting cable hangers. The isolator comprises a platform having a circular hole, two extenders extending away from the bottom surface of the platform, and two locking clips, wherein each locking clip extends from an extender in a direction that is away from the bottom surface of the platform.

As a second aspect, embodiments of the invention are directed to an assembly comprising a mounting structure and first and second adapters as described above.

As a third aspect, embodiments of the invention are directed to an isolator for mounting cable hangers comprising: a platform having a circular hole, two extenders, extending away from the bottom surface of the platform, and two locking clips, wherein each locking clip extends from an extender in a direction that is away from the bottom surface of the platform; and wherein the isolator is formed of a polymeric material.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
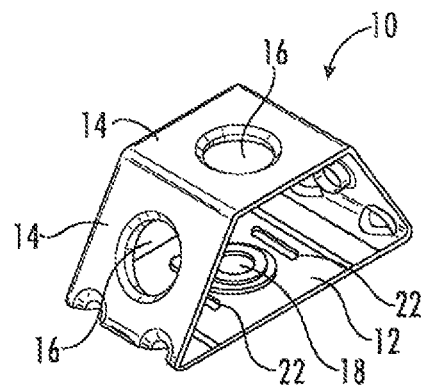
FIG. 1 is a perspective view of a prior art adapter for cable hangers.
Figure 2:
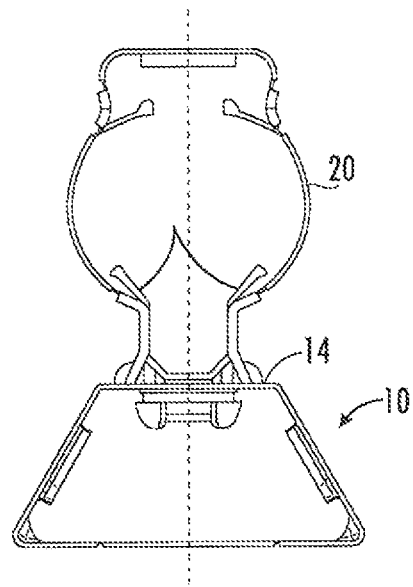
FIG. 2 is a top view of the adapter of FIG. 1 with a cable banger mounted therein.
Figure 3:
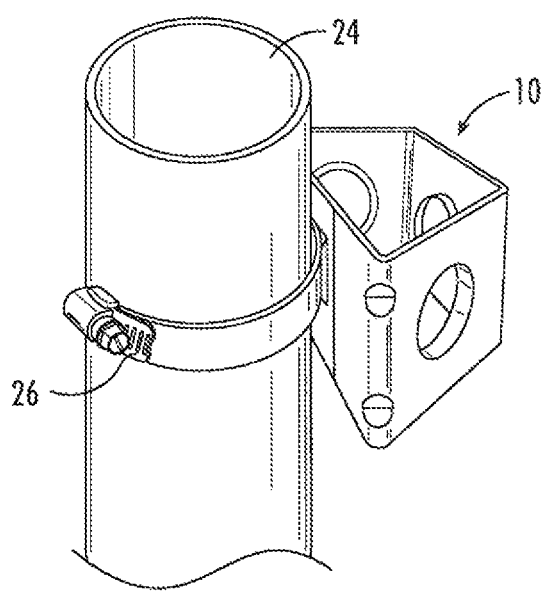
FIG. 3 is a perspective view of the adapter of FIG. 1 mounted to a pole via a hose clamp.
Figure 4:
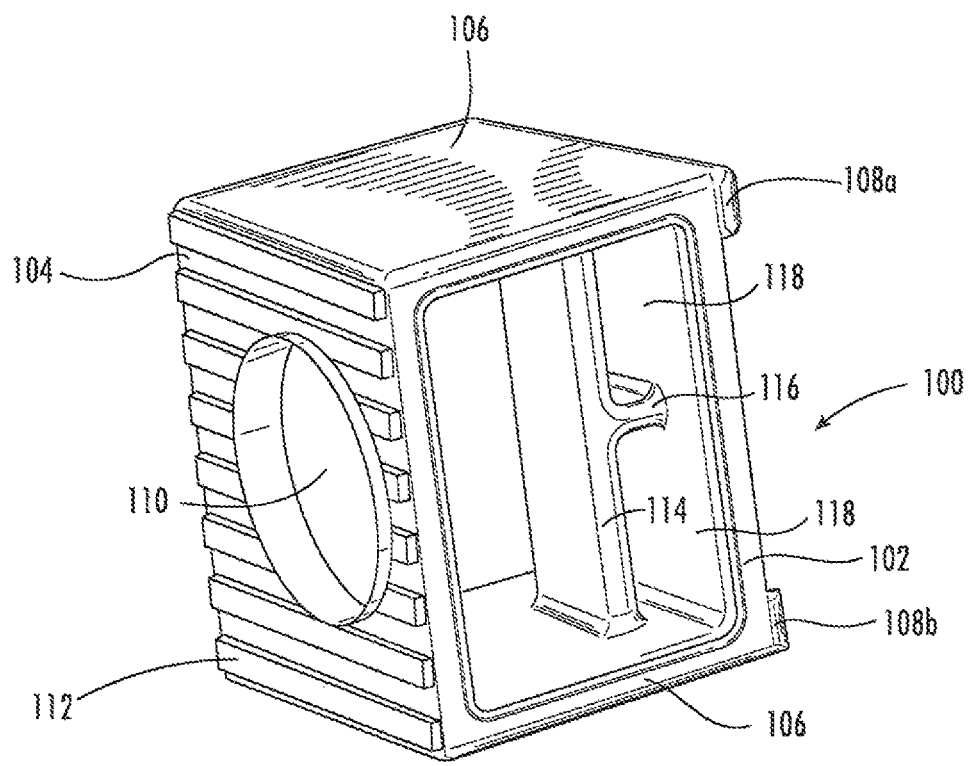
FIG. 4 is a front perspective view of an adapter for cable hangers according to embodiments of the invention.
Figure 5:
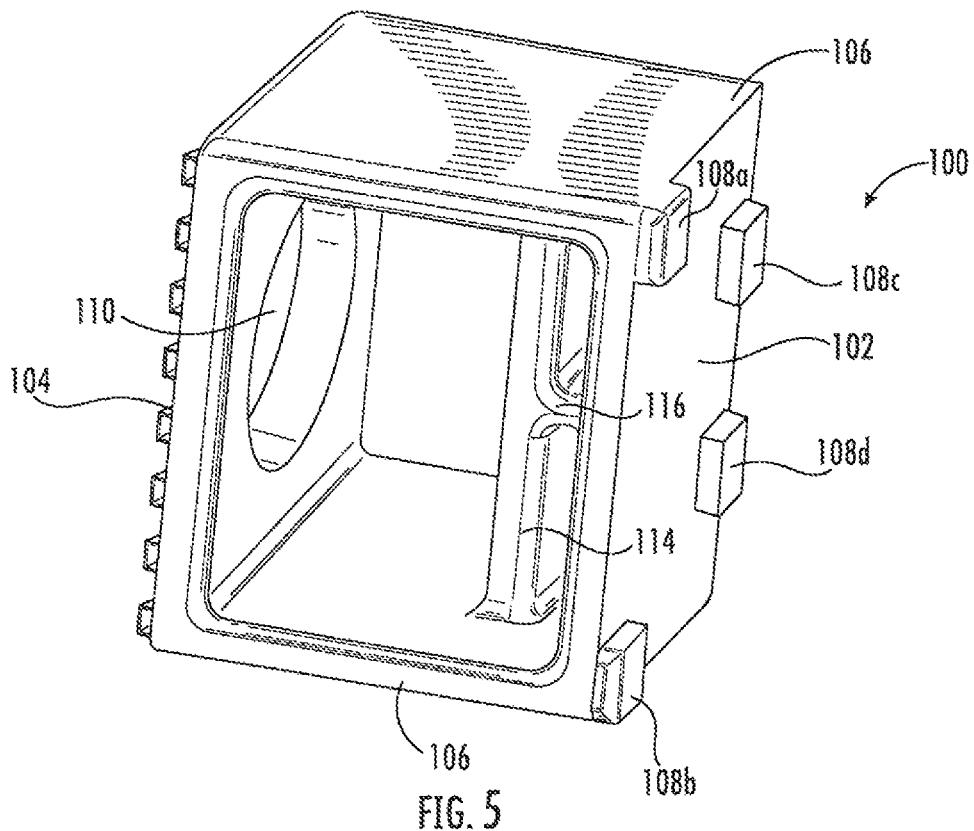
FIG. 5 is a rear perspective view of the adapter of FIG. 4.
Figure 6:
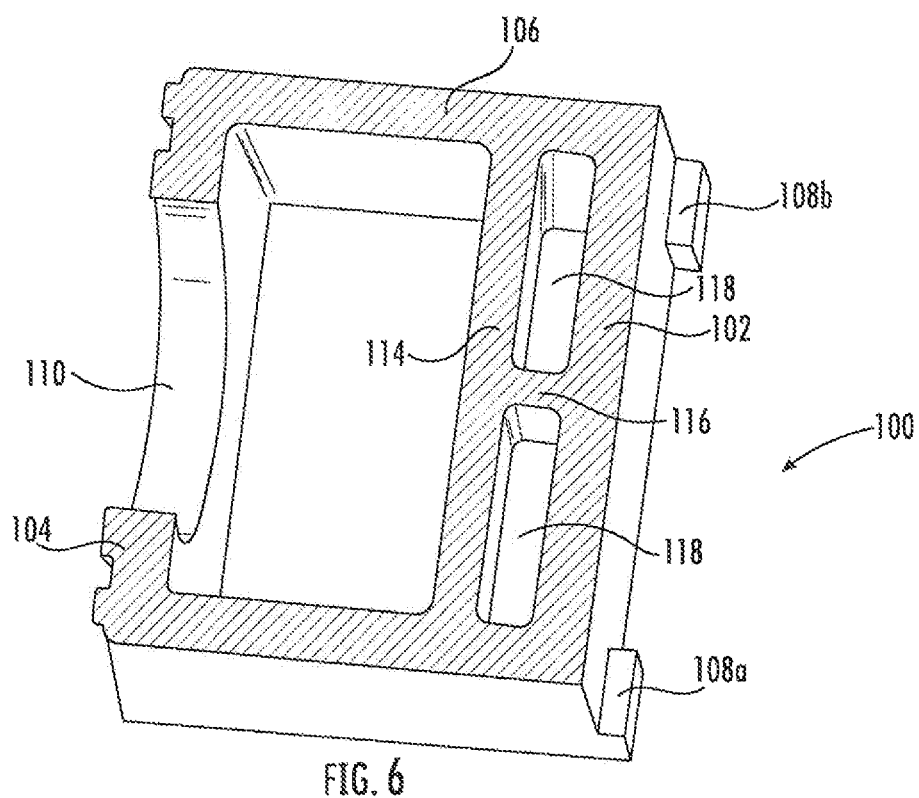
FIG. 6 is a perspective section view of the adapter of FIG. 4.

Referring now to FIGS. 4-7, an adapter for mounting cable hangers, designated broadly at 100, is shown therein. The adapter 100 includes a floor 102, a ceiling 104 opposite the floor 102, and two side walls 106 that span the floor and the ceiling 104. As can be seen in FIG. 5, the floor 102 is narrower in width than the coiling 104, such that each of the side walls 106 defines a trapezoidal or "wedge" shape. Four feet 108a-108d extend from the floor 102; in the illustrated embodiment, the feet 108a, 108b are located at two of the corners of the floor 102, whereas the feet 108e, 108d are located on the opposite edge from the feet 108a, 108b but are offset somewhat from the side walls 106 (in other embodiments, all four feet 108a-d may be located at the four corners of the floor 102). As shown in FIG. 4, the ceiling 104 includes a central hole 110; in some embodiments, the hole 110 is nominally ¾ inch in diameter, and thus is sized for the insertion of cables hangers such as that shown at 20 in FIG. 2. Parallel reinforcing ribs 112 are also present on the ceiling 104.

The adapter 100 also includes a cross-member 114 that extends between the side walls 106 near the floor 102. A divider 116 extends between the cross-member 114 and the floor 102. The floor 102, cross-member 114 and divider 116 create two windows 118.

In some embodiments, the adapter 100 is formed of a polymeric material, such as acetal, polyethylene, polypropylene, PVC, or the like. The adapter 180 may be formed by injection molding. In the illustrated embodiment, the positioning of the feet 108a-d and the orientation of the ribs 112 and the windows 118 can enable the injection molding of the adapter 100 with a simple reciprocating mold that requires no "side-action" mechanism.

Figure 7:
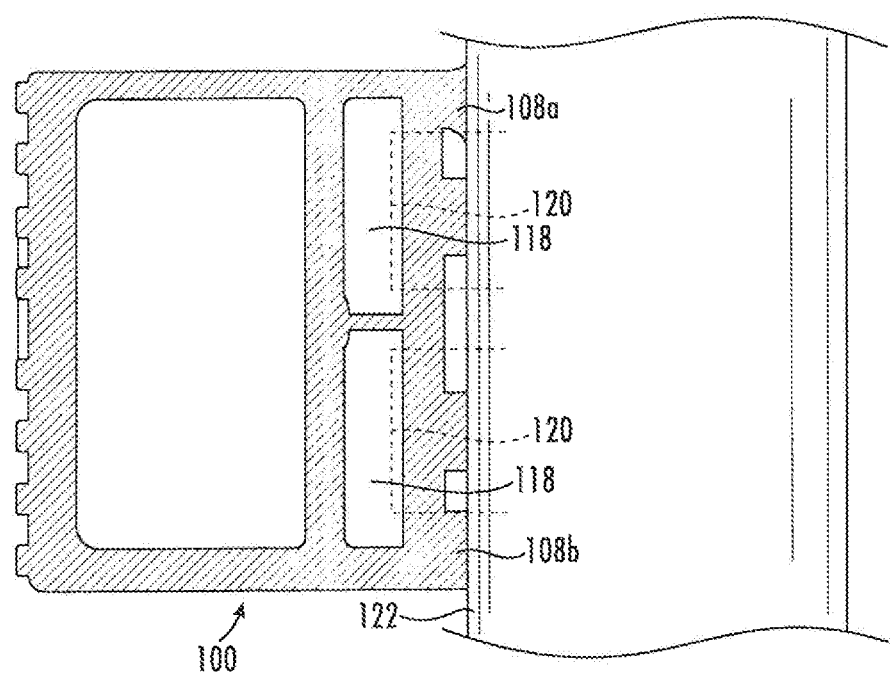
FIG. 7 is a side view of the adapter of FIG. 4 mounted to a mounting structure via two hose clamps.

As can be seen in FIG. 7, the windows 118 serve as receptacles for hose clamps 120 or other fastening devices, such as other radial clamping devices like straps, cable ties, and twist ties, clips and the like. The two hose clamps 120 shown in FIG. 7 are routed through respective windows 118 and around a mounting structure, such as a post 122 of an antenna mount, a monopole, or the like. The feet 108a-d contact the surface of the mounting structure 122 to provide a more stable foundation for the adapter 100. Once mounted on the mounting structure, the adapter 100 is positioned to serve as a mounting point (via the central hole 110) for a cable hanger, such as that shown in FIG. 2. Adapters 100 formed of a polymeric material can be used to mount a metallic cable hanger without creating a potential site of undesirable PIM. Of course, those skilled in this art will appreciate that the polymeric cables hangers, such as those described in U.S. Pat. No. 10,251,906, issued Apr. 9, 2019 (incorporated by reference in full herein), may also be employed.

Figure 8:
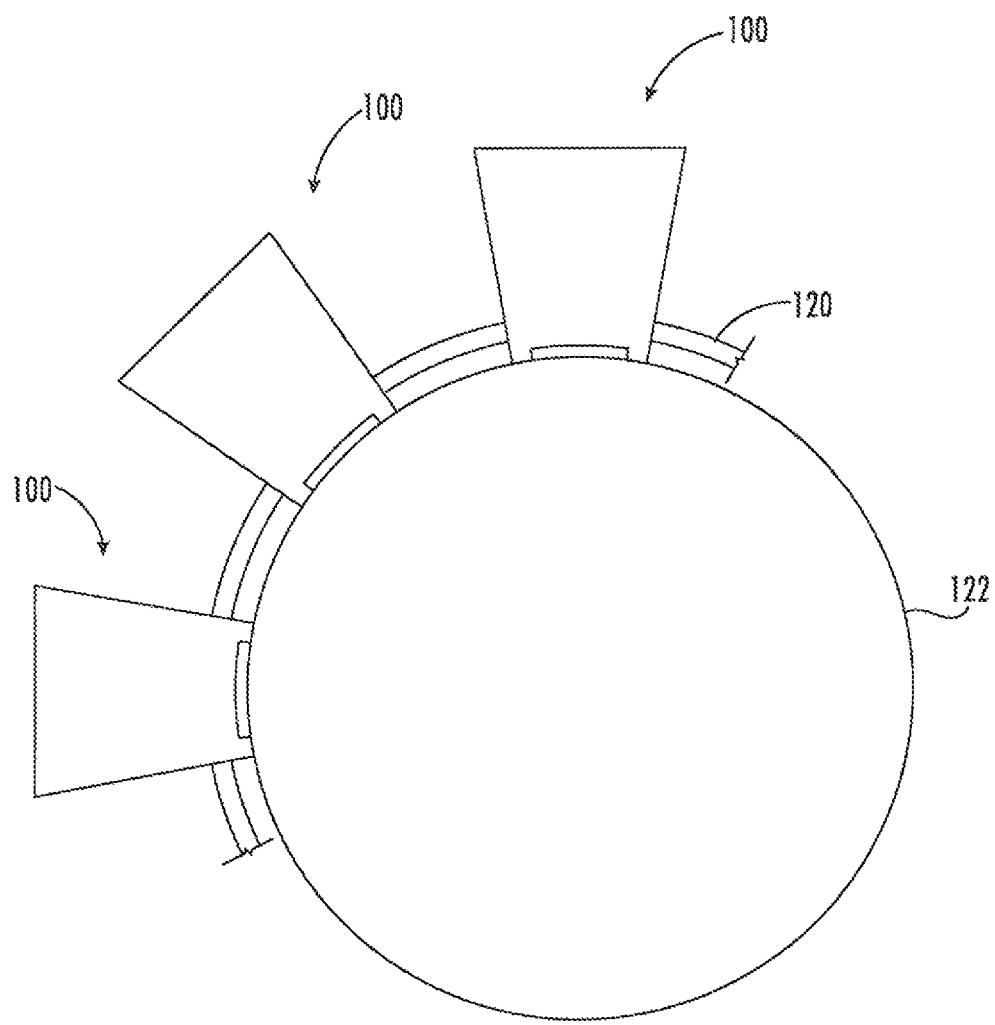
FIG. 8 is a schematic top view of three adapters of FIG. 4 mounted to a mounting structure with a common hose clamp.

As shown in FIG. 8, multiple adapters 100 can be mounted at the same elevation with a single hose clamp 120 (or pair of hose clamps 120). Each of the hose clamps 120 is simply routed through one of the windows 118 of each adapter 100 and secured around the mounting structure 122. The trapezoidal profile of the adapter 100 can help to increase of maximize the number of adapters 100 placed side-by-side around the mounting structure 100.

It will also be appreciated that the adapter 100 may be configured such that the side walls 106 may include holes for mounting a cable hanger. Further, in some embodiments, the "open" sides of the adapter 100 may be at least partially closed with side walls, which side walls may include holes for mounting additional cable hangers.

Figure 9:
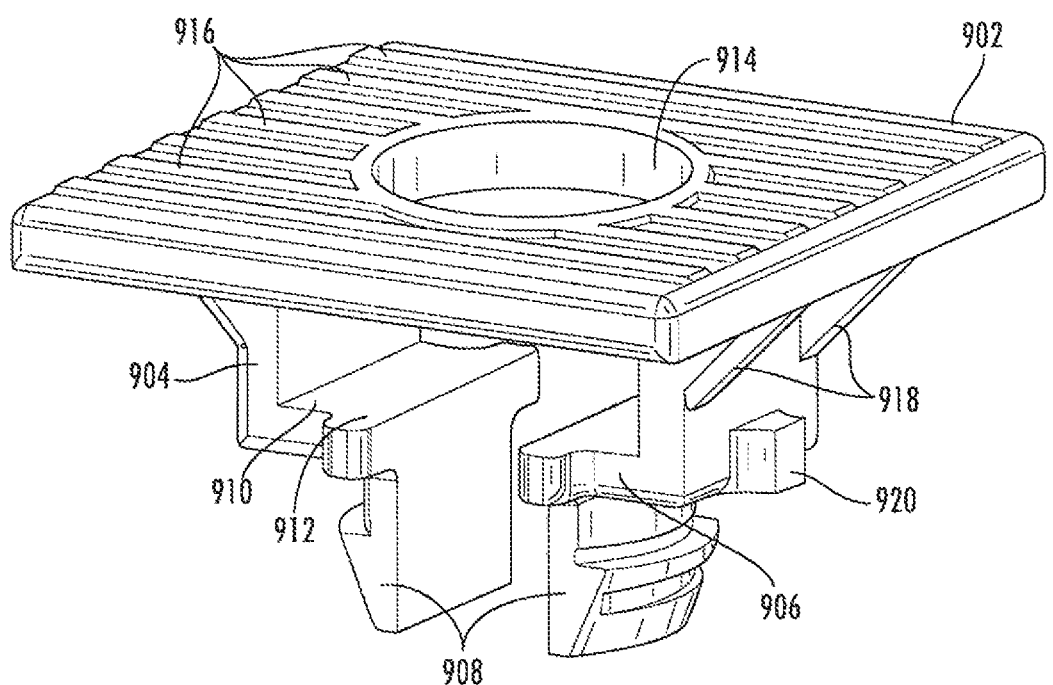
FIG. 9 is a perspective view of an isolator.
Figure 10:
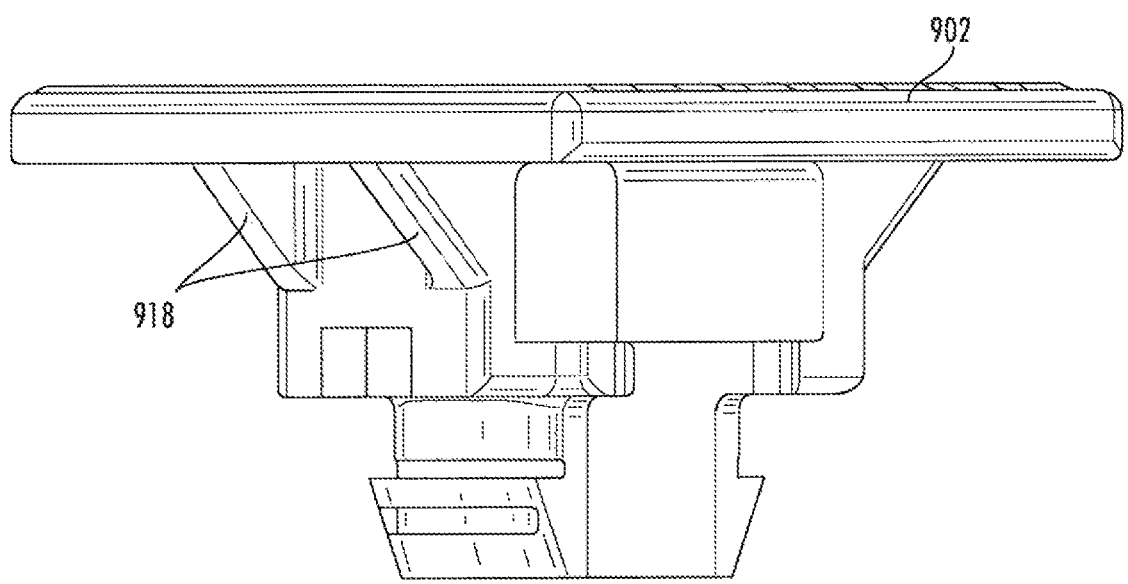
FIG. 10 is an elevation view of the isolator of FIG. 9.

Referring now to FIGS. 9-14, an isolator for mounting cable hangers, designated broadly as 900, is shown therein. The isolator 900 includes a platform 902, two extenders 904, two inner flanges 906, and two locking clips 908, wherein each inner flange 906 extends generally orthogonally from a corresponding extender 904 in a direction toward the other inner flange 906, and wherein each locking clip 908 extends from a corresponding inner flange 906 in a direction that is away from the bottom surface of the platform 902. As can be seen in FIGS. 9 and 10, the two extenders 904 extend away from the bottom surface of the platform 902, the extenders 904 are positioned generally parallel to each other, and each extender 904 is positioned at a location which is between the center of the platform 902 and a corresponding outer edge of the platform 902. The width of each extender 904 may span a portion of the platform 902 that is narrower than the width of the platform 902, or, in an alternative embodiment, the width of each extender 904 may span the entirety of the width of the platform 902.

As shown in FIG. 9, the two inner flanges 906 extend toward each other without touching each other, thereby creating a gap between the inner surfaces of the inner flanges 906. Each inner flange 906 may comprise a base section 910 and a wing section 912, wherein the wing section 912 is wider than the base section 910, thereby creating multiple surfaces, at which a force may be applied to move the leading surfaces of the inner flanges 906 toward each other to ease removal. Each outer edge of each wing section 912 may be rounded. Also, the wing section 912 can provide increased stability.

Figure 12:
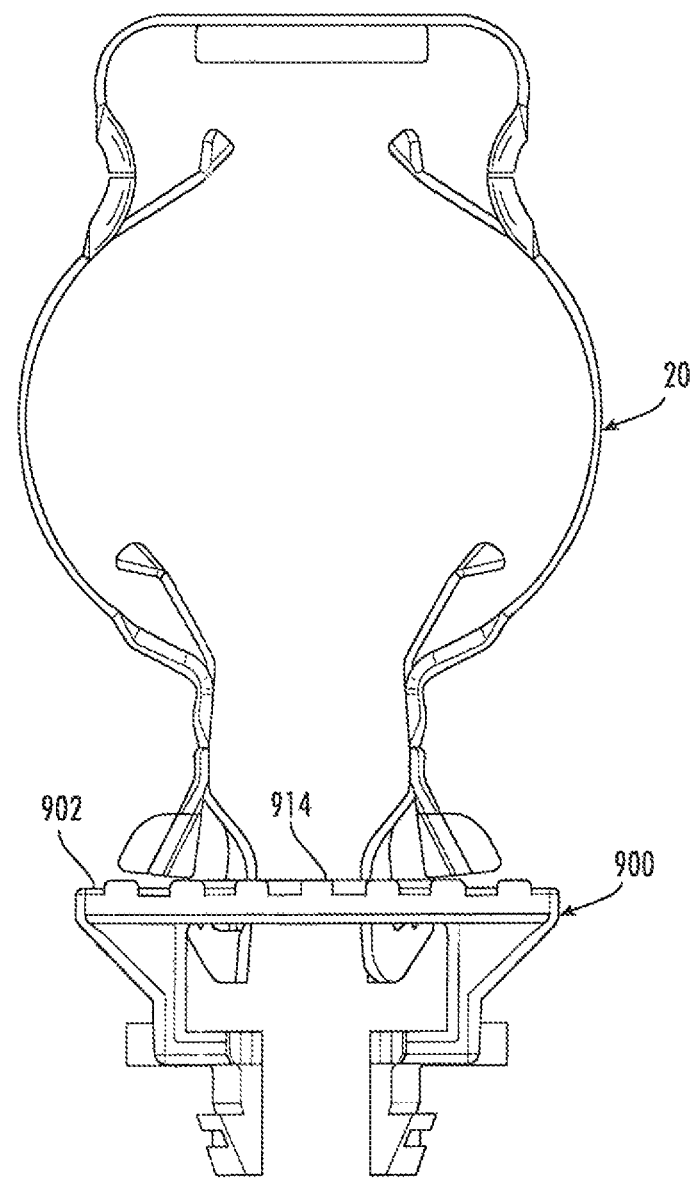
FIG. 12 is an elevation view of the isolator of FIG. 9 with a cable hanger mounted therein.

As shown in FIG. 9, the platform 902 includes a central hole 914; in some embodiments, the hole 914 is circular and nominally ¾ inch in diameter, and thus is sized for the insertion of cables hangers such as that shown at 20 in FIG. 12, Parallel reinforcing ribs 916 are also present on the top surface of the platform 902. The ribs 916 may run in a direction that is perpendicular to the extenders 904. In alternative embodiments, the top surface of the platform 902 may be flat and may not include the parallel reinforcing ribs 916.

As can be seen in FIG. 9, and further in FIG. 10, two gussets 918 may extend from the outer surface of each extender 904 to the bottom surface of the platform 902, thereby providing support for the platform 902.

As shown in FIG. 9, each extender 904 may include an outer flange 920 positioned on the outer surface of the extender 904. The outer flange 920 may provide additional stability for the isolator 900 when the isolator 900 is attached to a mounting surface. In addition, The outer flange 920 may provide a surface for a tool (such a pair of pliers or a proprietary/specialized removal tool) for the exertion of force in a concentrated manner, which can facilitate removal/installation.

While FIG. 9 shows the isolator 900 comprising two extenders 904, two inner flanges 906, IWO locking clips 908, two outer flanges 920, and four gussets 918, in alternative embodiments, the isolator 900 may include more or less of each of these components than shown in FIG. 9.

While the platform 902 is shown as a square in FIG. 9, in alternative embodiments, the platform 902 may be round, rectangular, oval, or may be formed as a variety of other shapes.

Figure 11:
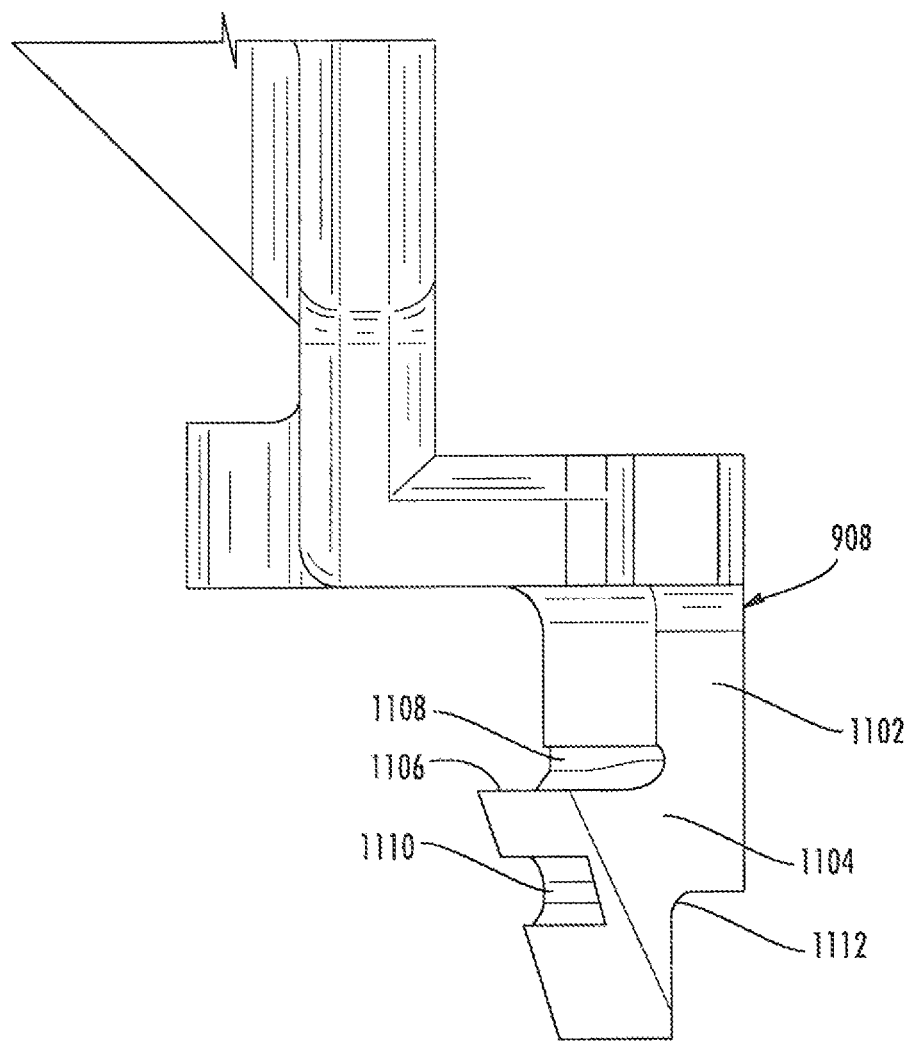
FIG. 11 is an elevation view of an extender and locking clip of the isolator of FIG. 9.

As can be seen in FIG. 11, each locking clip 908 may include a base section 1102 and a hook section 1104. The base section 1102 may extend for a length, that is equivalent to or slightly greater than a thickness of a surface to which the isolator 900 may be mounted (e.g., the platform 902 of another isolator 900 or other mounting surface such as the mounting panels 14 of the adapter 10, or the ceiling 104 of the adapter 100, or a post of an antenna mount). The outer surface of the base section 1102 may be rounded and may have a radius that is equivalent to or slightly less than a radius of an aperture within which the locking clip 908 may be inserted (e.g., hole 914 of another isolator 900 or an aperture of another mounting surface such as the mounting holes 16 of the adapter 10, or the hole 110 of the adapter 100). As shown in FIG. 11, the hook section 1104 may narrow from a barb surface 1106 to a leading edge of the hook section 1104. The barb surface 1106 may be flat (i.e., the barb surface 1106 may be parallel with the plane of the bottom surface of the platform 902), while the outer surface of the hook section 1104 may be rounded having a radius that decreases from the barb surface 1106 to the leading edge of the hook section 1104. As can be seen in FIG. 11, the outer surface radius of the hook section 1104 at the barb surface 1106 may be greater than the outer surface radius of the base section 1102.

As shown in FIG. 11, the outer surface of the base section 1102 of the locking clip 908 may have a cut-out 1108 above the barb surface 1106 of the hook section 1104. The outer surface of the hook section 1104 may have a cut-out 1110. In alternative embodiments, the base section 1102 may not include the cut-out 1108, and/or the hook section 1104 may not include the cut-out 1110.

As shown in FIG. 11, the hook section 1104 of the locking clip 908 may have a cut-out 1112 on the flat surface (i.e., the inner surface) of the hook section 1104, thereby increasing flexibility of the locking clip 908. In alternative embodiments, the hook section 1104 may not include the cut-out 1112.

As can be seen in FIG. 12, a cable hanger 20 may be attached to the top surface of the platform 902 by inserting, one or more clip mechanisms of the hanger 20 through the hole 914.

Figure 13:
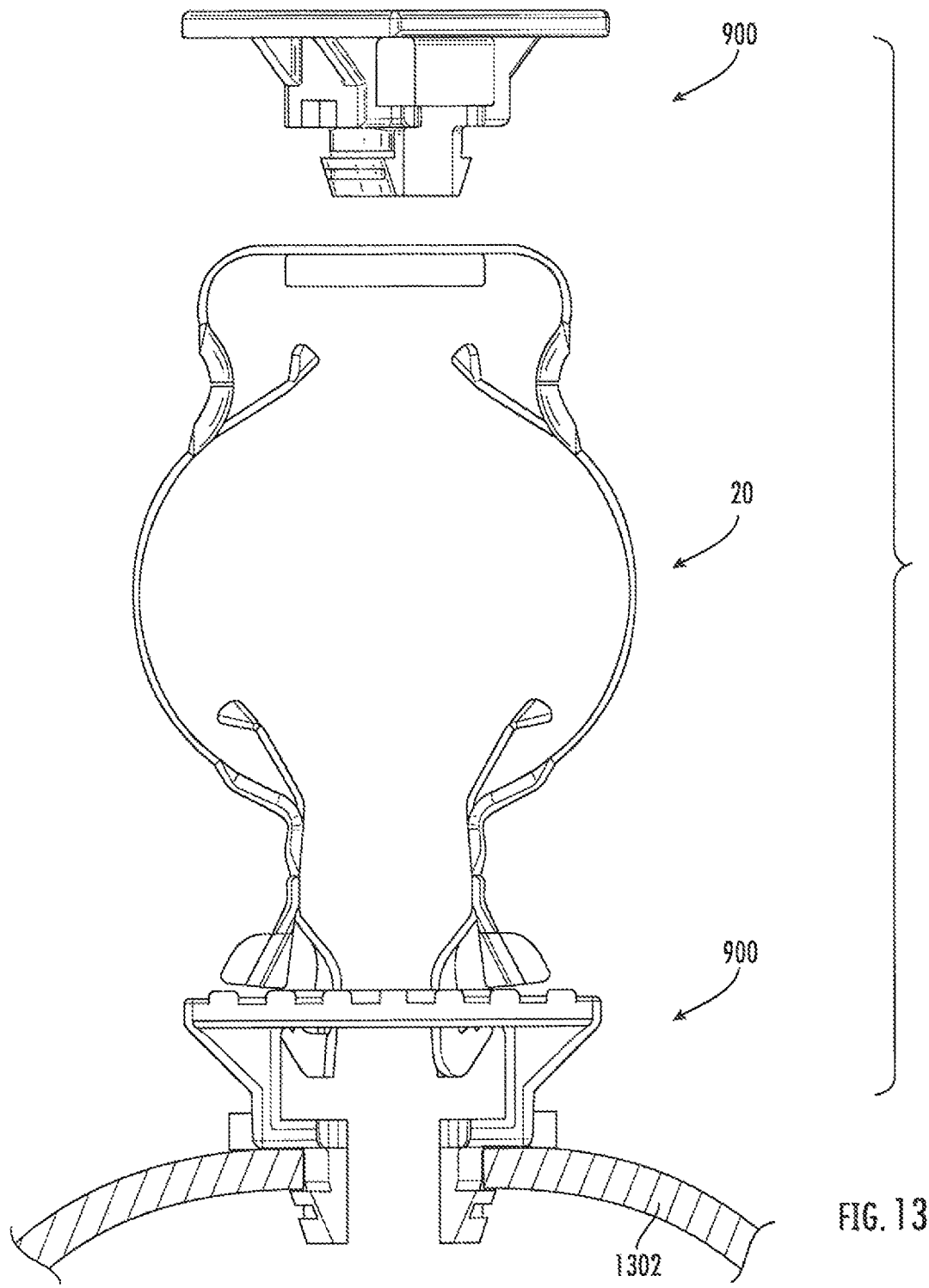
FIG. 13 is an elevation view of the isolator of FIG. 9 with a cable hanger mounted therein, wherein another isolator is mounted on the cable hanger.

As can be seen in FIG. 13, an isolator 900 may be attached to a cable hanger 20 by inserting the locking clips 908 through an opening on the top surface of the cable hanger 20. The cable hanger 20 may be a metal cable hanger.

As can be seen in FIG. 13, an isolator 900 may be mounted to a metal mounting surface (e.g., a metal pole 1302), and a metal cable hanger 20 may be mounted, to the isolator 900. In embodiments, a plurality of isolators 900 may be mounted to each other, thereby extending the distance between a mounting surface (e.g., metal pole 1302) and a cable hanger 20 that is mounted to one of the isolators 900.

Figure 14:
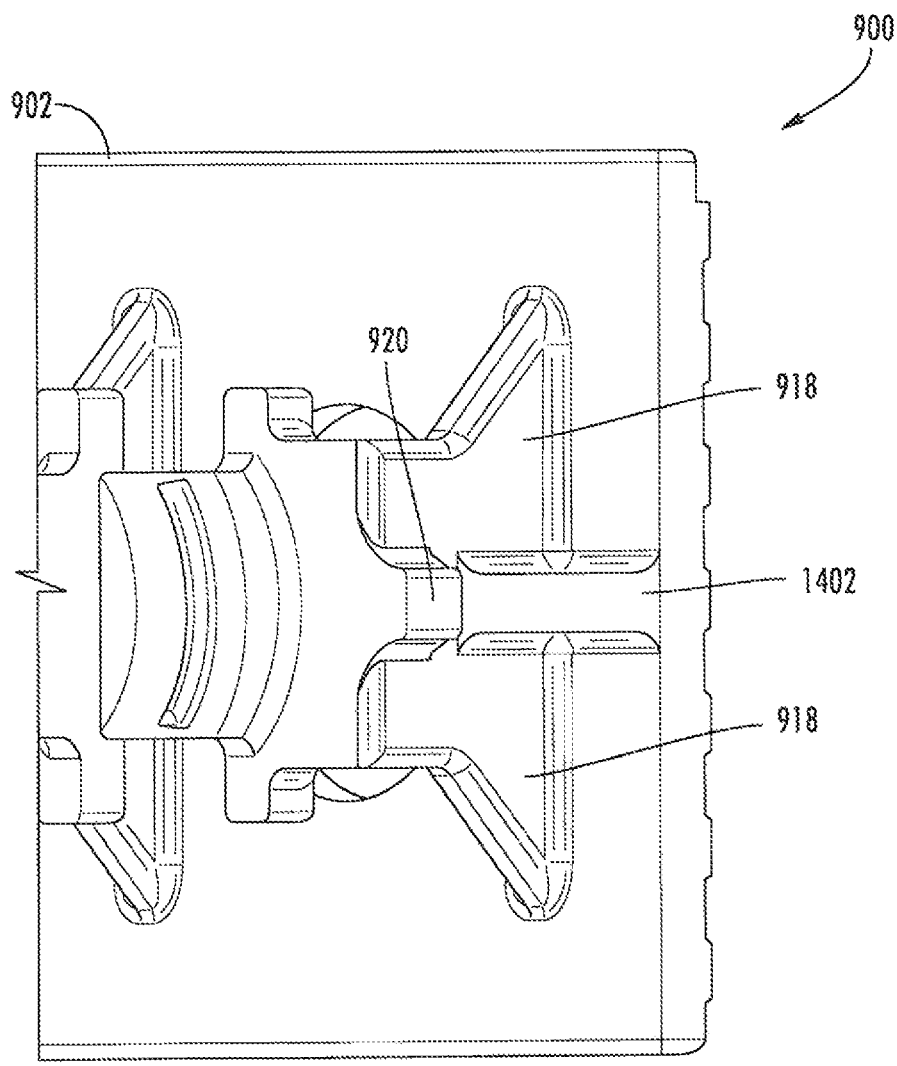
FIG. 14 is a bottom perspective view of the isolator of FIG. 9.

As can be seen in FIG. 14, the isolator 900 may include an additional support gusset 1402 that is positioned perpendicular to the gussets 918. The support gusset 1402 may extend from just above the outer flange 920 to the bottom surface of the platform 902. As shown in FIG. 14, the side edges of the outer flange 920 may be filleted, thereby providing a surface upon which a force may be applied to rotate the isolator 900 when the isolator 900 is attached to a mounting surface.

In some embodiments, the isolator 900 is formed of a polymeric material, such as acetal, polyethylene, polypropylene, PVC, or the like. The isolator 900 may be formed by injection molding.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An isolator for mounting cable hangers, comprising:
   a platform having a circular hole;
   two extenders extending away from a bottom surface of the platform, wherein a gap is present between the extenders; and
   two locking clips, wherein each locking clip extends from an extender in a direction that is away from the bottom surface of the platform;
   wherein the isolator is formed of a polymeric material; and
   wherein the isolator is in combination with a first cable hanger mounted in the circular hole, wherein the first cable hanger grasps a first cable, and wherein no cable is present in the gap between the extenders of the isolator; and
   wherein each locking clip comprises a base section and a hook section, wherein outer surfaces of the base section and the hook section are rounded, and wherein a radius of the outer surface of the base section is smaller than the radius of the outer surface of the hook section.

2. The isolator defined in claim 1, wherein the mounting hole has a nominal diameter of ¾ inch.

3. The isolator defined in claim 1, wherein the top surface of the platform comprises parallel reinforcing ribs.

4. The isolator defined in claim 1, wherein the rounded outer surface of the base section has a nominal diameter of ¾ inch.

5. The isolator defined in claim 1, wherein the outer surface of the hook section comprises a cut-out.

6. The isolator defined in claim 1, wherein an inner surface of the hook section comprises a cut-out.

7. The isolator defined in claim 1, wherein the hook section comprises a barb surface and a leading edge, wherein the radius of the outer surface of the hook section decreases from the barb surface to the leading edge.

8. An assembly, comprising:
   a metal mounting structure with a mounting hole;
   an isolator as defined in claim 1 mounted in the mounting hole of the metal mounting structure.

9. The assembly defined in claim 8, wherein the mounting structure is a post of an antenna mount.

10. The assembly defined in claim 8, wherein the isolator is formed of a polymeric material.

11. The assembly defined in claim 8, wherein the isolator is a first isolator, the assembly further comprising a second isolator and a second cable hanger, wherein the second isolator is mounted on the first cable hanger, and wherein, the second cable hanger is mounted in the hole of the second isolator.

12. The assembly defined in claim 11, further comprising a second cable mounted in the second cable hanger.

\* \* \* \* \*